US 7,398,215 B2

(12) United States Patent
Mesbah et al.

(10) Patent No.: US 7,398,215 B2
(45) Date of Patent: Jul. 8, 2008

(54) PROMPT LANGUAGE TRANSLATION FOR A TELECOMMUNICATIONS SYSTEM

(75) Inventors: Ibrahim Mesbah, Tempe, AZ (US); Eyor Alemayehu, Tempe, AZ (US)

(73) Assignee: Inter-Tel, Inc., Tempe, AZ (US)

( * ) Notice: Subject to any disclaimer, the term of this patent is extended or adjusted under 35 U.S.C. 154(b) by 970 days.

(21) Appl. No.: 10/746,734

(22) Filed: Dec. 24, 2003

(65) Prior Publication Data

US 2005/0149335 A1    Jul. 7, 2005

(51) Int. Cl.
*G10L 11/00* (2006.01)
(52) U.S. Cl. ..................... 704/277; 379/88.05
(58) Field of Classification Search ................. 704/235, 704/260, 270, 275, 277; 379/88.01, 88.05, 379/88.06, 88.13, 88.14–88.263
See application file for complete search history.

(56) References Cited

U.S. PATENT DOCUMENTS

| 5,157,606 | A | | 10/1992 | Nagashima |
| 5,296,641 | A | * | 3/1994 | Stelzel ......................... 84/602 |
| 5,434,776 | A | | 7/1995 | Jain |
| 5,442,782 | A | | 8/1995 | Malatesta et al. |
| 5,499,335 | A | | 3/1996 | Silver et al. |
| 5,613,122 | A | | 3/1997 | Burnard et al. |
| 5,664,206 | A | | 9/1997 | Murow et al. |
| 5,678,039 | A | | 10/1997 | Hinks et al. |
| 5,900,871 | A | | 5/1999 | Atkin et al. |
| 5,903,859 | A | | 5/1999 | Stone et al. |
| 6,175,819 | B1 | * | 1/2001 | Van Alstine .................. 704/235 |
| 6,219,638 | B1 | * | 4/2001 | Padmanabhan et al. ..... 704/235 |
| 6,690,932 | B1 | * | 2/2004 | Barnier et al. ........... 455/414.1 |
| 6,751,299 | B1 | * | 6/2004 | Brown et al. ............. 379/88.18 |
| 6,791,707 | B2 | * | 9/2004 | Laverty et al. ............. 358/1.15 |
| 6,813,777 | B1 | * | 11/2004 | Weinberger et al. ........... 725/76 |
| 6,914,964 | B1 | * | 7/2005 | Levine ......................... 379/52 |
| 6,920,425 | B1 | * | 7/2005 | Will et al. .................... 704/275 |
| 2002/0083103 | A1 | | 6/2002 | Ballance et al. |

FOREIGN PATENT DOCUMENTS

EP    0335710 A3    10/1989

* cited by examiner

*Primary Examiner*—Michael Opsasnick
(74) *Attorney, Agent, or Firm*—Michelle Whittington, Esq.

(57) ABSTRACT

A prompt translation application for use in a telecommunications messaging system provides an administrator with a plurality of messaging prompts in a base language for revising, translating, and editing. The administrator can nearly simultaneously revise both a visual component of a prompt and an audio component of the prompt, and save the revisions for use on any number of associated endpoints. In the preferred embodiments, revisions to the visual component are made by user input, such as keystrokes, and to the audio component by selection of audio segments to be played in a particular order.

28 Claims, 8 Drawing Sheets

PROMPT LANGUAGE TRANSLATION FOR A TELECOMMUNICATIONS SYSTEM

FIELD OF INVENTION

The present invention relates generally to language translation and more particularly, to a visual and audio prompt language translation application for use in a telecommunications system.

BACKGROUND OF THE INVENTION

Language translation presents particular problems to the software industry. Developers must be aware of cultural nuances for multiple countries at the time of a program release. Additionally, how well the developer internationalizes and localizes the software application often determines how successful the product will be in other countries. Regardless of how close the developer translates and customizes the software product to match a particular locale, errors often remain in the translated version due to regional dialects and the like.

Commercially available translation products attempt to minimize the number of remaining errors in a translated product by using an automated or rule-based translation system. For example, translation on a concatenated word-by-word basis may help to improve the accuracy of the material. These translation products are costly and often require an expert to launch. Once the translation is complete, edits often require a total system reboot and the return of the expert.

Other message-translation systems attempt to localize the software product by identifying portions of the data that require translation. These types of systems use various techniques to localize the software, such as message translations using keyword lookups, applying language-specific data looked up from message files, and database tables pre-loaded with translated information associated with a base language to use as a reference when translating to language-specific messages. These systems generally permit software created for a single market to be revised for multiple languages by a systematic substitution of message references within the software code. Revisions can be made quickly and the translation table references are relatively easy to implement. However, these types of translations are limited to simple sub-sentence displayed messages and provide no means for end users to make adjustments for longer message prompts that often contain dynamic variables (e.g., time of day, day of week, etc.).

Another problem with translation applications is the inability to make on-the-fly local translation adjustments to the software. Typically, any adjustments made to the system require a complete shut down or restart of the programs. In a telecommunications application, even a short shut down interval results in missed telephone calls and voice messages.

Modern telecom products provide integration between the endpoint (e.g., desktop telephone or keyset), personal computer, and PBX. For example, Unified Communicator®, an integration product from Inter-Tel, Inc., permits the user to control and manage telephony functions using a personal computer or an endpoint. In this manner, the user is able to view control functions and messages on either the display of the endpoint or the computer. Thus, these types of modern telephony products must be able to support language translation in both audio (e.g., voice messages) and visual (e.g., text messages on the endpoint and/or computer displays), and preferably simultaneously.

Moreover, advanced programming systems, such as in the telecommunications industry, undergo constant updating and revisions. Language translation systems must be able to accommodate these software updates on a regular basis without requiring a complete re-translation of the program.

It is also desirable to allow multiple translations of the same program to coexist on one system. For example, the program may be available in a base language, such as English, and have multiple languages available, such as French, Spanish, Japanese and Chinese, for selection at individual endpoints.

Accordingly, an improved system and method for language translation is needed. In particular, a translation system providing an easy-to-use prompt selection that is locally customizable and available across a network is needed. Additionally, a prompt language translation system for simultaneous visual and audio translations in a telecommunications application is desired. Moreover, a language translation system that is conducive to a dynamic system, such as in a telephony messaging system with variable data and reoccurring updates, is needed.

SUMMARY OF THE INVENTION

A telecommunications messaging system generally includes a switching apparatus for connecting real-time voice and multimedia communications to a plurality of endpoints. Visual messaging and audio messaging systems are coupled to the switching apparatus and to the endpoints for providing textual messaging prompts and audio messaging prompts at the endpoints. The prompts are retrieved from prompt memories of the messaging systems. An administration workstation in communication with the messaging systems includes a display, audio system and input device. A messaging prompt translation computer program product includes code for displaying messaging prompts in a base language at the workstation, playing a recording of the messaging prompts, revising the prompts in a secondary language in response to directions designated by the input device, and for storing the revised messaging prompts in a secondary language file. An administration programming computer product includes code for uploading the files to the prompt memories and for associating one of the files with each endpoint, whereby, each of the endpoints display and play the messaging prompts in either the base language or the secondary language.

A method for language translation of visual and audio messaging prompts in a PBX-type telecommunications messaging system generally includes selecting a messaging prompt for translation from stored message prompts. Further includes, viewing a visual component of the prompt on a workstation and hearing an audio component of the prompt played on the workstation. The audio component comprises a set of audio word segments that are revised by rearranging the set. The visual component is revised by inputting a translation. The method includes saving the revised visual and audio components of the message prompt in a memory for use on one or more endpoints of the messaging system.

In another embodiment, a prompt translation method for use in a telecommunications messaging system having endpoints participating in voice mail messages which are viewable and audible as message prompts at each of the endpoints, includes storing data comprising message prompts in a base language at a visual/audio prompt archive of the system. Viewing each of the message prompts and determining if a translation of a visual component and an audio component of the prompt is needed. Translating, by user input, the components of the prompt and viewing the translated visual component in a translated language and hearing the translated audio component in the translated language. Storing data comprising the prompt in the translated language in a messaging memory of the system, whereby upon selection for each endpoint, the voice mail messages are viewable and audible at the endpoints in the translated language or the base language.

A computer system for providing translation of message prompts in a PBX-type messaging system generally includes an administration site means and an endpoint site means. The administration site includes a first means for displaying a visual component of each message prompt to an administrator and a second means for playing a sound recording of an audio component of each of the message prompts to the administrator. A third means for permitting the administrator to create a translated version of the components and a fourth means for storing the translated version of the components in a prompt memory. Fifth means for associating the translated version to at least one of the endpoints. The endpoint site generally includes a sixth means for displaying the translated version of the visual component to an end-user, and a seventh means for playing the translated version of the audio component to the end-user when a PBX-type message is available for the endpoint.

BRIEF DESCRIPTION OF THE DRAWINGS

These and other features, aspects, and advantages of the present invention may be best understood by reference to the following description taken in conjunction with the accompanying drawings, wherein like reference numerals indicate similar elements.

DETAILED DESCRIPTION

The present invention provides an improved system and method for language translation of visual and audio data. The present system has particular use in the telecom industry such as in a messaging program or product. As such, the following disclosure will be described with reference to an application in a telecommunications system. It should be appreciated that the various systems and methods of the invention are not limited to a telecom application and may have equal applicability to other systems, such as ATMs, entertainment systems, and messaging products. The particular details of a prompt language translation system and various methods will follow, to include a preferred embodiment and best mode.

Used herein "prompt" refers to an informational message that is visual and/or audible to a message recipient. Although not required, typically prompts request a response or action from the recipient. With respect to the telecommunications industry, prompts are generally used to inform the recipient of stored messages, incoming calls, endpoint status, as well as various other telecommunication functions and features.

Figure 1:
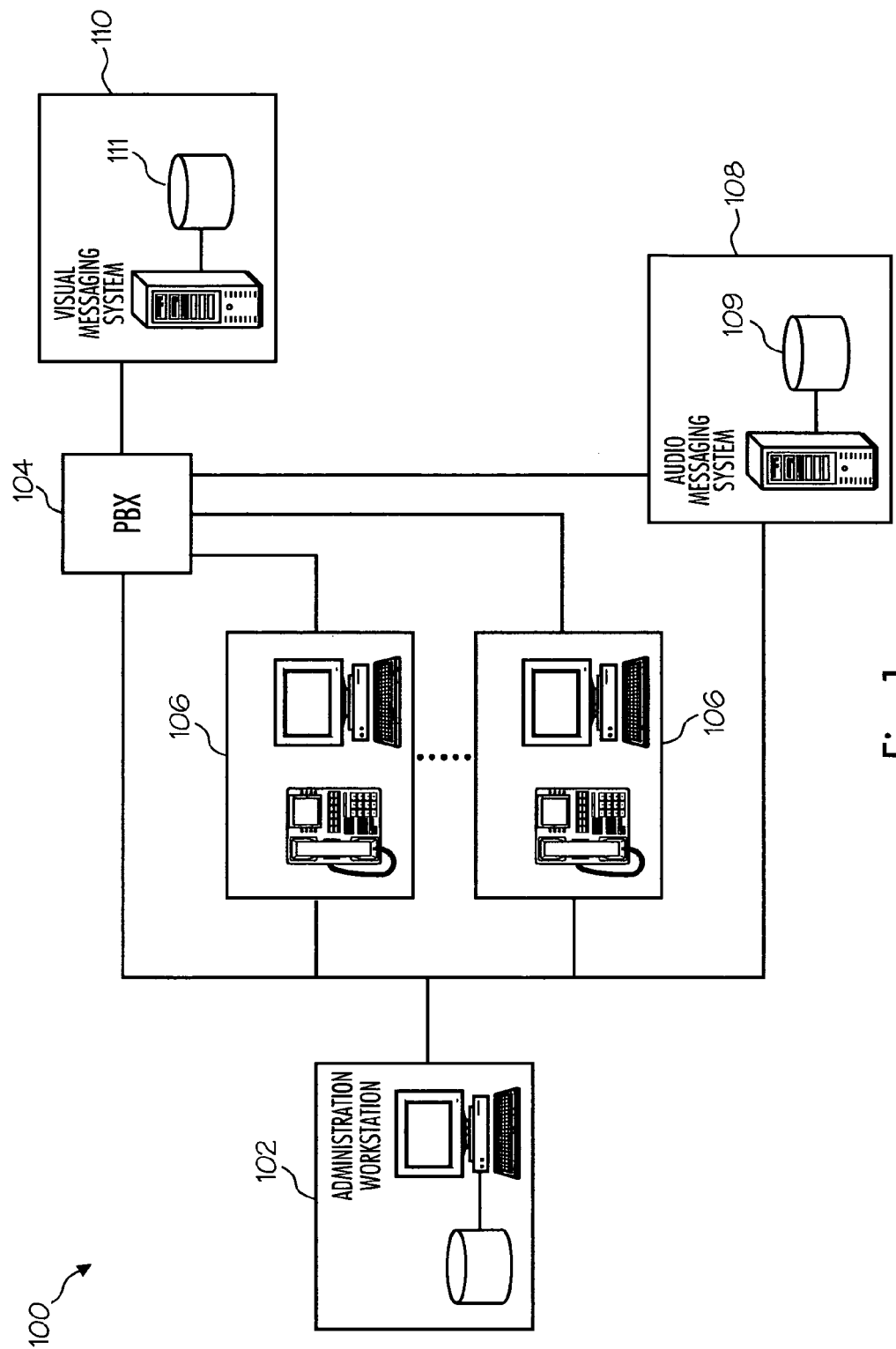
FIG. 1 illustrates an exemplary system architecture for a prompt language translation application in accordance with the invention.

FIG. 1 illustrates an exemplary system architecture 100 in which the present system and methods for prompt language translation may function and operate. System architecture 100 generally includes an administration workstation 102, a PBX (private branch exchange) or PBX-like equivalent 104, one or more collective endpoints 106, an audio messaging system 108, and a visual messaging system 110. Those skilled in the telecommunications industry will readily recognize that system architecture 100 includes elements common to a voice and data messaging system for business or workplace applications. Thus, implementation of the present invention typically does not require any additional hardware or costly components.

Administration workstation 102 may include any computing device capable of executing and storing software applications, as well as processing inputs, displaying data and playing recordings. As will be discussed in detail below, one aspect of the invention provides the programmer the ability to view, hear, control and manage various prompts associated with the audio and visual data to be translated. As such, workstation 102 preferably includes a CPU, a suitable user input device or means (e.g., keyboard, touch screen, voice recognition, etc.), an audio system (e.g., sound card, multimedia system, and speakers) and a display. A computing program embodying the present language translation application may reside in a storage means of workstation 102. Any suitable storage means such as a disk-based database, memory, removable media, and/or data logging devices, and others, may be used. It should be appreciated that workstation 102 may include multiple memory elements used for storing a variety of data and applications within the workstation. Additionally, it should be appreciated that the storage may include one or more storage elements capable of storing data immediately relevant to the invention as discussed herein, as well as various other data.

PBX or PBX-like system 104 is generally well known in the telecom industry and provides telephone and messaging services as needed to multiple office users (i.e., endpoints 106). Provided services typically focus on the delivery of external and internal telephone calls to a commercial business. In general, PBXs are office-based telephone exchanges having special functions directed towards business users. Similarly, the PBX is any customer-owned switching apparatus that is used to connect real-time voice or multimedia communications from user-to-user (or endpoint-to-endpoint) regardless of the technology employed, such as time division multiplexing, packet switching, optical switching, or any combination thereof. Modern PBXs also provide integrated voice mail (e.g., audio messaging system 108 and visual messaging system 110), hands free intercom calls, call center functions, complex system networks, and additional features using external computer control. It should be appreciated that although not illustrated, PBX system 104 may include various interfaces as needed for communication within architecture 100.

System architecture 100 includes one or more endpoints 106. Used herein, "endpoints" may include singly or in combination, telephones (stationary and portable), IP-based phones, software-based phones, keysets, personal computers, computing devices, personal digital assistants, pagers, wireless remote clients, messaging devices, and any other communication device capable of transmitting and receiving communication signals. Preferably, the endpoint includes an input or control means and a display. In one particular embodiment, endpoint 106 is an office workstation associated with a keyset. The office workstation may include a computing device, such as a stationary or portable personal computer having a memory, database, display and input means. The workstation is preferably coupled to the keyset (e.g., a multi-function desktop telephone) so communication and status information is available on either unit. Alternatively, the endpoint may be a keyset integrated with computing capabilities, such as the Model 8690™ multimedia endpoint available through Inter-Tel, Inc. Endpoint 106 may be in communication with various other systems within system 100. For example, each endpoint 106 preferably has connectivity to PBX 104.

Audio messaging system 108 includes hardware and/or software configured to monitor events from endpoints, and manage and display messages for users within the network. In this manner, there are communications links between audio messaging system 108, endpoints 106, and PBX 104. For example, the various components may be coupled using a standard LAN, OAI link, any other suitable connection means or any combination thereof. The operations associated with an audio messaging system are generally known in the industry and therefore will not be discussed in detail. However, the particular details of the invention as it pertains to messaging systems will be described.

An audio messaging system 108, in accordance with the invention, preferably includes an audio prompt memory 109 for storage of audio prompts associated with coupled endpoints. Memory 109 may include any suitable storage means such as a disk-based database, RAM devices, flash memory, or other high capacity devices suitable for real-time software applications.

The messaging capabilities of system architecture 100 further include a visual messaging system 110. Visual messaging system 110 may be similar in structure to audio messaging system 108, however system 110 is configured to provide a visual description of messages (e.g., cause the display of the message's envelope as well as other message-related data) and similar functions on a display of an endpoint. In accordance with the invention, visual messaging system 110 preferably includes a visual prompt memory 111 for storage of visual prompts associated with coupled endpoints.

Although depicted as separate entities in the present figure, it should be appreciated that audio messaging system 108 and visual messaging system 110 may reside in the same physical unit(s), share the same routing, memory, etc. or any combination thereof. For instance, integrated messaging solutions are commercially available for both audio and visual messaging with the Enterprise™ Messaging Solution and Axxess® CP, both available through Inter-Tel, Inc.

Figure 2:
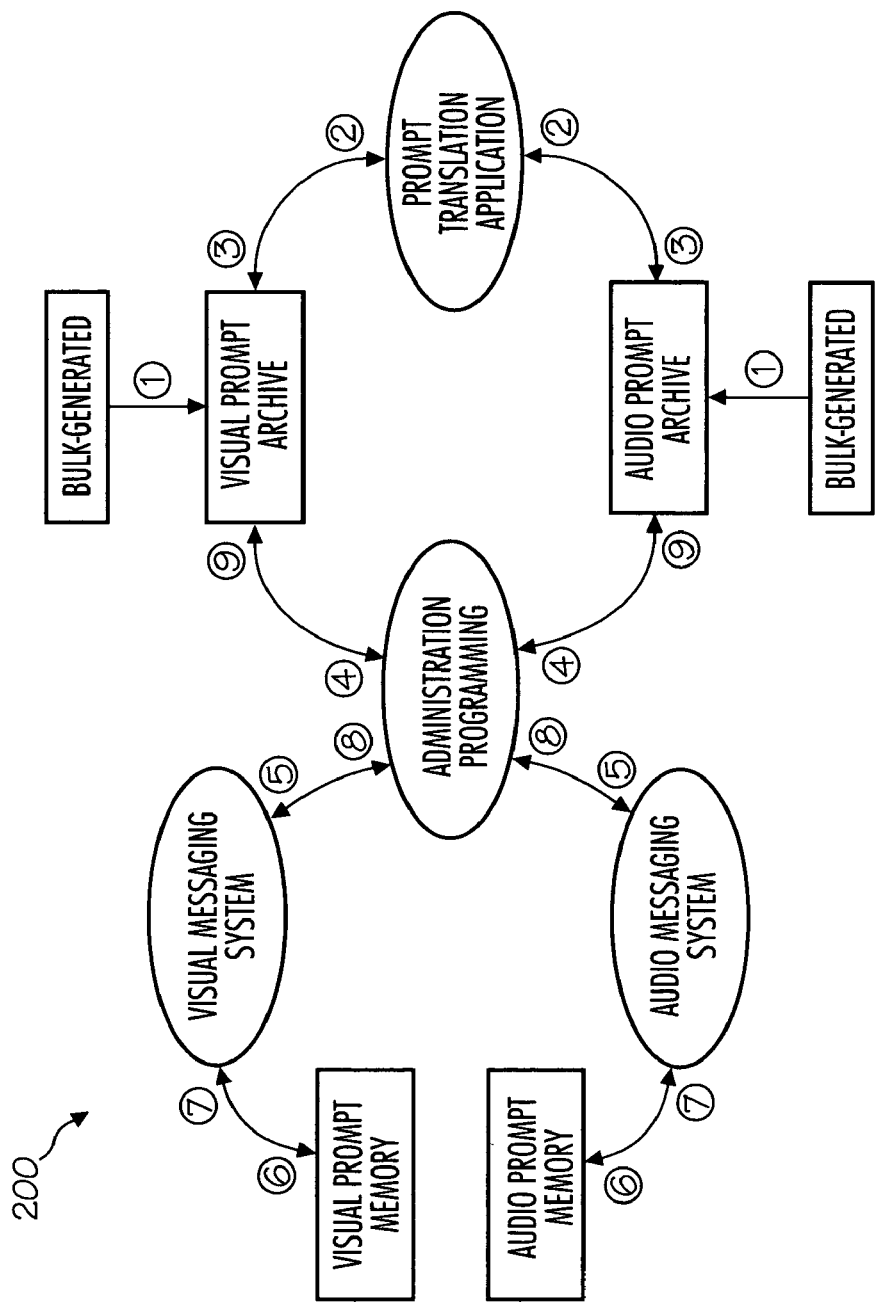
FIG. 2 illustrates a dataflow diagram of a prompt language translation application in accordance with an embodiment of the invention.

Referring now to FIG. 2, a dataflow diagram 200 of a prompt translation application in accordance with a primary embodiment of the invention is illustrated. Diagram 200 generally includes signal, dataflow and routing between the various systems of a prompt translation application of the invention. Additionally, the Figure illustrates a step-by-step process flow with corresponding numbered descriptions. It should be appreciated that the steps are presented in sequence for ease of discussion and, unless stated otherwise, not to set forth any particular order. Initially, a visual prompt archive and an audio prompt archive are loaded with respective visual and audio information requiring translation (1). The archives may be any element capable of data storage and retrieval. The archives are depicted as separate storage elements, however the storage may be implemented as a single unit or multiple units. Additionally, the archives, prompt translation application, and administration programming illustrated on diagram 200 may be housed in a single workstation (e.g., administration workstation 102) or in multiple workstations connected within a network.

In one particular embodiment, the archives may be loaded with information from a factory-delivered call processing system, a commercially available bulk translation, a visual and/or audio language pre-load process, or any other similar method. For example, numerous commercial processes provide automated bulk translation of information, such as GlobalConcat™ available through International Services, Inc. Bulk translation processes typically translate entire programs using rule-based or similar automation techniques. Although these types of systems are of benefit and generally translate a major portion of the data desired for translation, they can only provide a good starting point. A prompt translation application of the present invention is primarily intended to "clean-up" or finalize language translation received from bulk-generated or other types of translation processes. However, it should be appreciated that the systems and methods of the invention may be useful in a complete translation process as well.

In the illustrative embodiment, files containing the bulk-generated translations are opened from the archives into the prompt translation application (2). The prompt translation application unifies the information from both archives and integrates the data so translations can be performed almost simultaneously. This is especially useful when a particular prompt contains both visual and audio components, as discussed in further detail below.

An administrator views the textual contents of the prompts, both visual components and audio components of the prompt, and listens to the audio information to determine if additional translation is needed. If so, then the administrator is able to quickly edit both a textual version and an audio version (if there are both) of the message and save the data simultaneously.

Upon completion of an editing session with the prompt translation application, the edited or "proofed" information may be renamed, such as to correspond to a language, dialect, or well-known file format (e.g., XML), and is returned to the respective archive (3), i.e., visual or audio. By saving the information in a variety of well-known file formats, the administrator may be able to expand the availability of the system. The proofed information is now ready for upload, e.g., as binary data, to the network's messaging systems.

Administration programming may be used to facilitate the translation process. In this sense, administration programming may enable access to several systems within the system architecture (e.g., architecture 100) to coordinate data transfer, management, control and storage to the various system nodes. Administration programming may be used to direct the proofed information from the archives (4) to the messaging systems (5). Alternatively, in one particular embodiment, the proofed information may be saved in the archives and then automatically routed to the messaging system for upload without requiring re-direction from administration programming. The visual messaging and audio messaging systems are illustrated as separate entities, however as previously mentioned, these systems may be combined. Each messaging system accesses a memory (6) that stores an updated set of prompts specific for the network. For example, in one particular embodiment, users of the network are able to select specific versions or languages of the translated program. The visual and audio prompt memories house specific translated versions that may be called up each time for the user or may be stored particularly for that user. Thus, users can select particular languages, dialects, etc. to be displayed at their individual endpoints.

A prompt translation process, in accordance with the invention, may be repeated as many times as needed for as many versions, dialects, languages, etc, as the network requires. For example, to perform a revision of proofed information, the data stored in the visual prompt and audio prompt memories is recalled (7). In one particular embodiment, the stored data in the memories is downloaded to the archives (9) for review and edit. After further adjustments to the data are finalized, the data is uploaded again to the messaging systems (5) and more particularly to the prompt memory (6).

The various operations of the present invention will now be discussed in detail to further facilitate understanding of the invention and its best mode. It should be appreciated that the particular implementations shown and described are illustrative of embodiments of the invention (including its best mode) and are not intended to limit the scope of the present invention in any way. It should be appreciated that additional steps may occur that are not represented on the following flowcharts but are discussed in the conjoining text or elsewhere herein. Moreover, there may be operations, functions, routines, and the like that are not depicted on the flows or elsewhere but are well understood in the industry as common actions for a telecommunications system.

Figure 3:
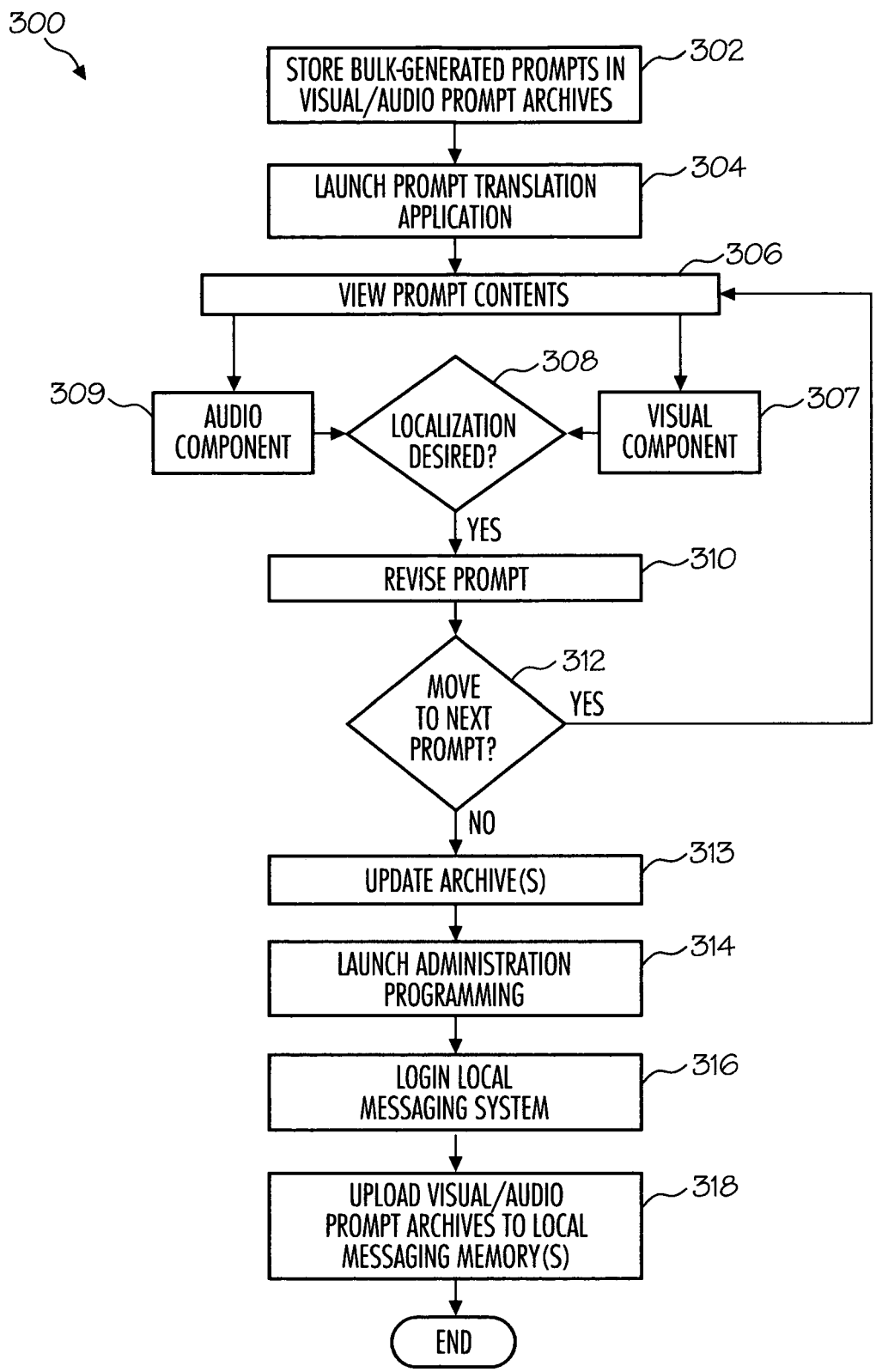
FIGS. 3 and 4 are flowcharts of exemplary operations of a prompt translation application in accordance with various processes of the invention.

FIG. 3 is a flowchart 300 of the operation of a prompt language translation system (e.g., exemplary system 100) in accordance with one embodiment of the invention. In particular, flowchart 300 generally describes the operations of initially installing a new or base language for use in a telecommunications system. Initially, an administrator, or the like, loads a set of visual and/or audio translated prompts, such as by a bulk translation program, and stores the set in a visual prompt archive and/or an audio prompt archive (step 302). In accordance with the invention, the visual and audio prompts may be stored in a database or any suitable storage or memory element retrievable by the system and system administrator. The pre-translated set of information may be labeled and stored as a "base" language to be used as a reference or starting point for the administrator. As previously mentioned, a prompt language translation application of the invention has particular usefulness as a clean-up tool or a fine language translation for information that has already been translation by, for example, a bulk translation program. Moreover, the administrator need only be an individual familiar with the base language and translated language or dialect, and does not need to be an expert programmer.

The administrator launches a prompt translation application of the invention (step 304), which may be selected from an administration workstation (e.g., workstation 102) and stored on a database of the workstation or available through a network connection. Through the prompt translation application, the administrator is able to select, view, manage, edit, add and delete all of the prompt translations available from the visual/audio archives. In this manner, the administrator views the contents of the prompt in the base language (step 306). One aspect of the invention is the ability to view, revise, translate and edit both audio and visual components of a prompt nearly simultaneously. For instance, some prompts may have both a visual component (step 307) and an audio component (step 309), such as "Message Deleted" prompt. The user may hear the prompt "Message Deleted" as well as simultaneously see the message on an endpoint display. For these types of prompts, the administrator is able to view the contents of the prompt in the exact manner as the prompt will appear on the endpoint, as well as to hear how the audio component of the prompt will sound at the endpoint.

A visual component of a prompt may be displayed for the administrator (step 307), such as any of the common prompts programmed in a modern telecommunications messaging system. For example, an endpoint (e.g., endpoints 106) in combination with a messaging system (e.g., systems 108/110) may cause the endpoint to display "John Is Holding" when a call from John is holding. Continuing with the provided example, "John" may be a variable in the prompt because the caller's name changes depending on the name associated with the holding number. Thus, the prompt viewable by the administrator may simply be "[name] Is Holding" where [name] denotes a variable.

The administrator determines if the audio and/or visual components of the prompt are translated to satisfaction or if localization is needed (step 308). If editing is desired, the administrator can make the changes to both the visual component or how the prompt will appear on the endpoint display and the audio component or how the prompt will sound at the endpoint (step 310). The administrator can move through the prompts one-by-one to make any needed edits to the translation (step 312).

When the administrator determines that the current session is complete, i.e., the administrator is satisfied with the visual and audio prompts, the archive(s) are updated with the revised prompts (step 313). In this manner, the revisions may be held in a temporary storage until the administrator confirms the revisions by, for example, executing a Save or Save As function. Alternatively, the archives may be updated immediately following the revision.

The updates are ready to be implemented in a messaging system. In one particular embodiment, the administrator launches an administration programming (step 314) capable of controlling, managing, and routing data between the various systems of a network, such as the administration programming previously described. At this time the prompt translation application may be closed. The administrator logs into a local messaging system or systems (step 316), such as visual messaging system 110 and audio messaging system 108. The administrator may login using a password or some other form of authorization depending upon the particular application and network environment. The stored prompts are uploaded from the archives to a local messaging memory(s) (step 318), such as prompt memories 109 and 111, and are now available for immediate use on associated endpoints.

Figure 4:
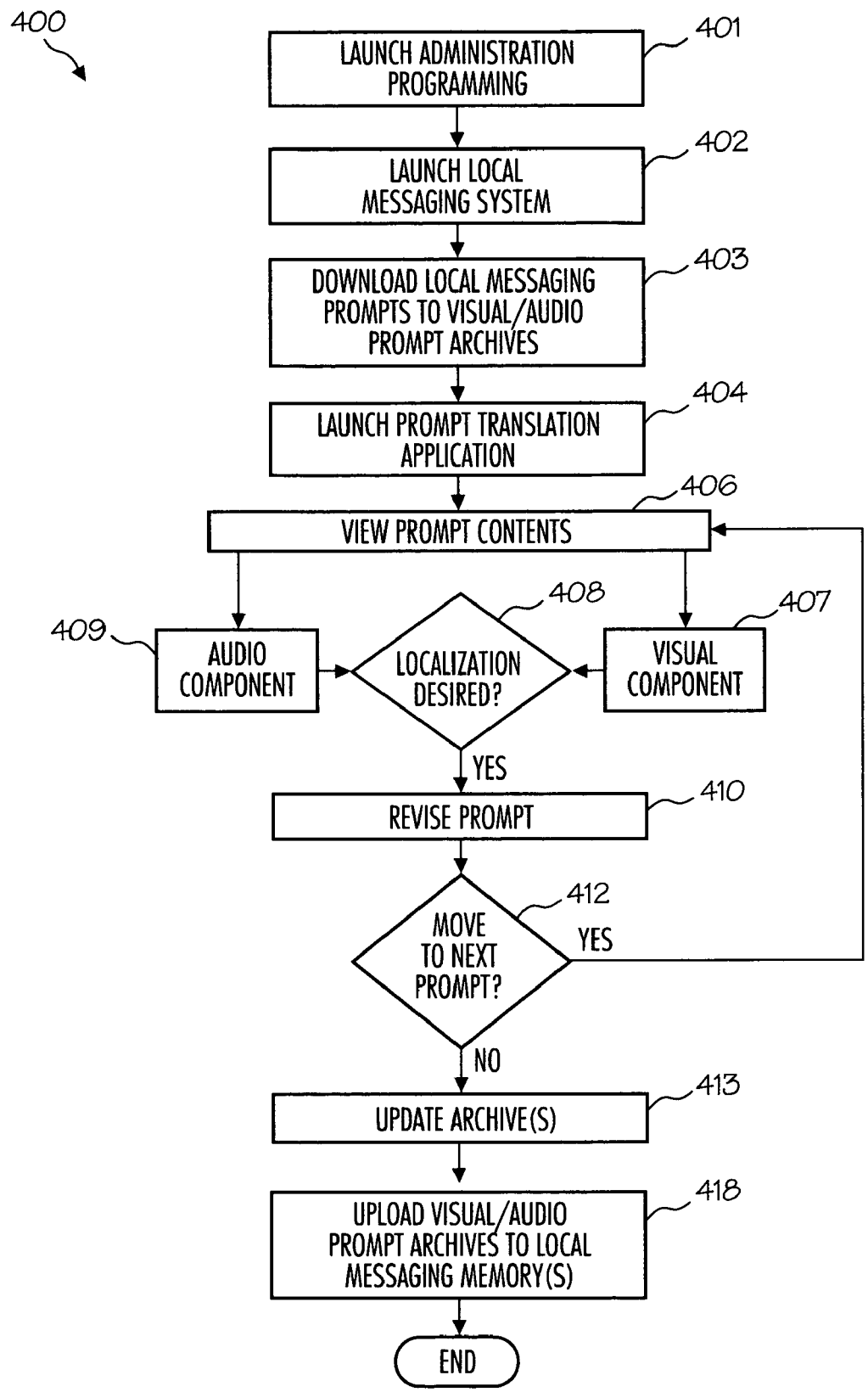

FIG. 4 is a flowchart 400 of another operation of a prompt language translation system (e.g., exemplary system 100) in accordance with one embodiment of the invention. In particular, flowchart 400 generally describes the operations of editing or revising one of the language programs already in use. For instance, the previous exemplary flowchart 300 broadly described the initial steps for establishing a new or base language. Once the base language is uploaded in the messaging system(s), it is available for use on any associated endpoint. However, one aspect of the invention is the ability to select another language or dialect apart from the base language to be associated with an individual's endpoint. In this manner, the base language is the now the starting point for the administrator to translate to another language or particular dialect.

Initially, the administrator launches an administration programming (step 401) to facilitate management and control of desired translation actions, in a manner as previously described. The administrator may also launch the local messaging system (step 402) or similar system where the base language prompts are stored. The local messaging prompts in the base language are downloaded from the local messaging memory(s) to the visual/audio prompt archives (step 403). The prompt translation application of the invention is enabled (step 404) and the administrator begins the editing process. It should be realized that the previous steps may occur in a varied order depending on the environment and/or network.

The process for revising the base language to another language or dialect is similar to the process for initially revising the base language. The administrator views the contents of the prompt (step 406) and determines if localization is desired (step 408). It should be realized that similar to flowchart 300, the administrator is able to view the contents of the visual component (step 407) as well as view and hear the audio component (step 409) of the prompt. If localization is needed, then the administrator can quickly revise the prompt (step 410) and move from prompt to prompt, both visual and audio, until all the prompts are localized to the administrator's satisfaction (step 412).

When complete, the archives are updated (step 413) and the administrator may choose to save the revisions as a new language reference so the base language will remain intact. The new language reference is uploaded to the local messaging memory(s) to be used with associated endpoints (step 418). In alternate embodiments, the archives are updated immediately following any revisions and may be uploaded automatically to the local messaging memories.

The processes described in the above flowcharts may be performed as many times as the administrator desires to add new languages, dialects, and so on. This is particularly useful for global companies with employees preferring different languages. An example is a communication system in Mexico that has a division in Spain. The Mexican version in the Spanish language may be the base language and can be delivered to the Spain location. Localization may take place in Spain by an administrator to customize the version for the Spain dialect. The translations performed in Spain may be copied back to the office in Mexico, and by uploading the version for Spain separately, both locations can have employees selecting their desired language, i.e., Mexican version or Spanish version.

The particular operations and accompanying discussions have been provided; however, it is helpful to review examples of various programming screens that may be viewed by an administrator operating a prompt translation application of the invention. The following figures represent a preferred embodiment for implementing a prompt language translation application in accordance with the disclosure, however one skilled in the industry will readily recognize modifications may be made as needed to suit a specific environment, network or application that are within the spirit of the invention.

Figure 5:
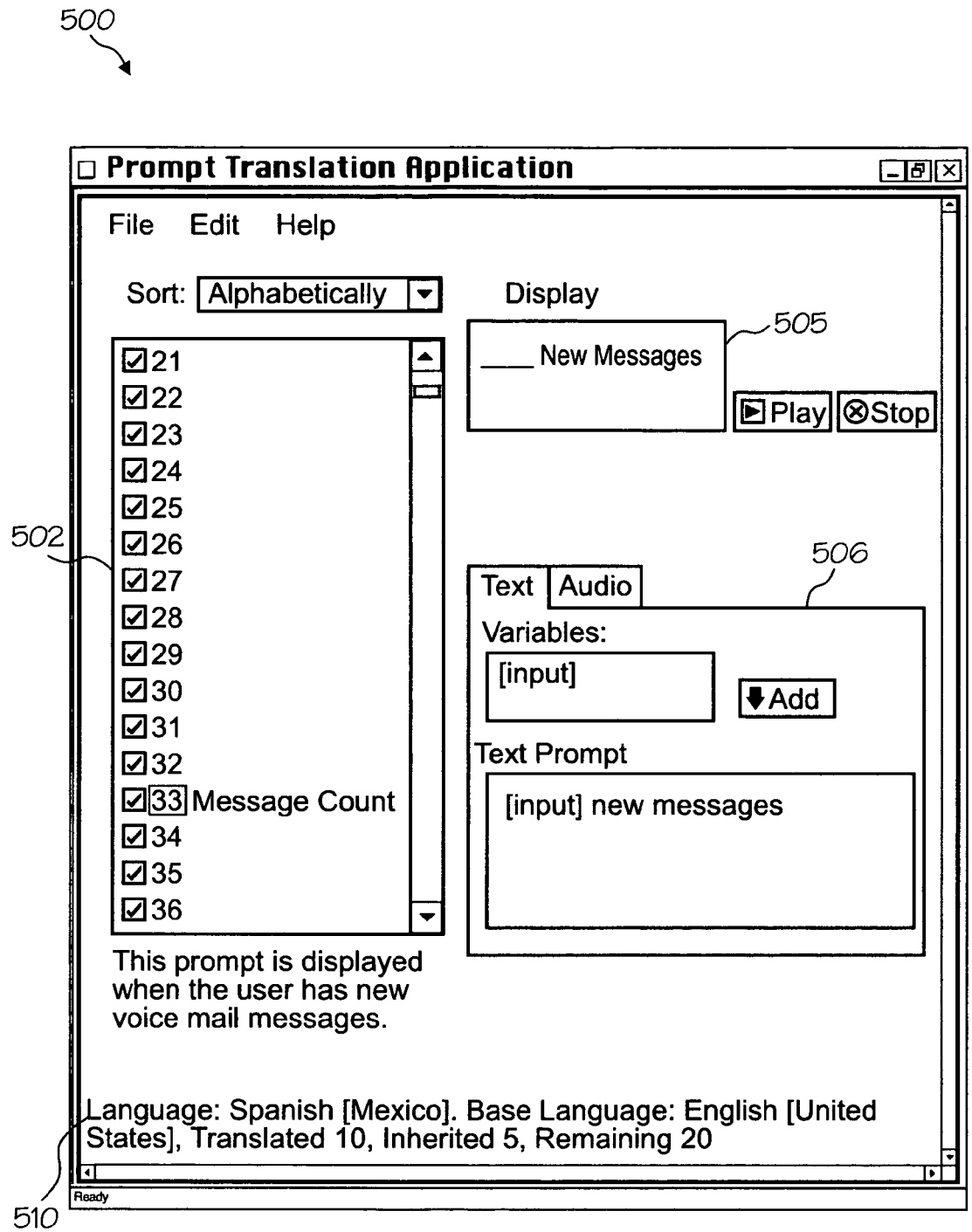
FIGS. 5-9 illustrate various exemplary programming screens viewable by an administrator implementing a prompt translation application of the invention.
Figure 9:
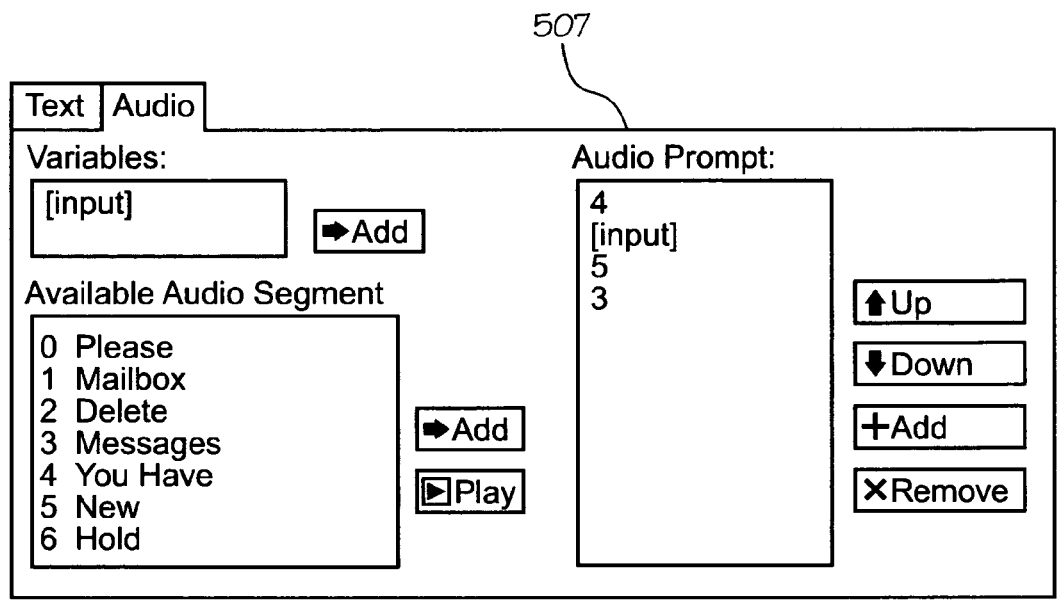

FIG. 5 illustrates a programming screen 500 of a prompt translation application of the invention. In general, screen 500 includes menu items (e.g., "File" "Edit" "Help"), a prompt list 502, a display field 505, a tab control 506 and 507 (FIG. 9), and a status bar 510. Prompt list 502 includes a complete list of call processing or voice mail prompts available for the current translation. In this particular embodiment, each entry in prompt list 502 has a checkbox followed by a numerical counting. Additionally, the name of the prompt may appear either upon selection or highlight (such as moving a cursor over the number) or may be included permanently for easy identification. The "Message Count" prompt is shown in this example as the prompt under construction. When a prompt is selected in the prompt list, the other controls of the prompt translation application are configured to translate the selected prompt. If the checkbox for the prompt is checked, the other controls of the application are configured with the values of the equivalent prompt in the translation of the base language. In one embodiment, by default, these checkboxes are checked.

Figure 6:
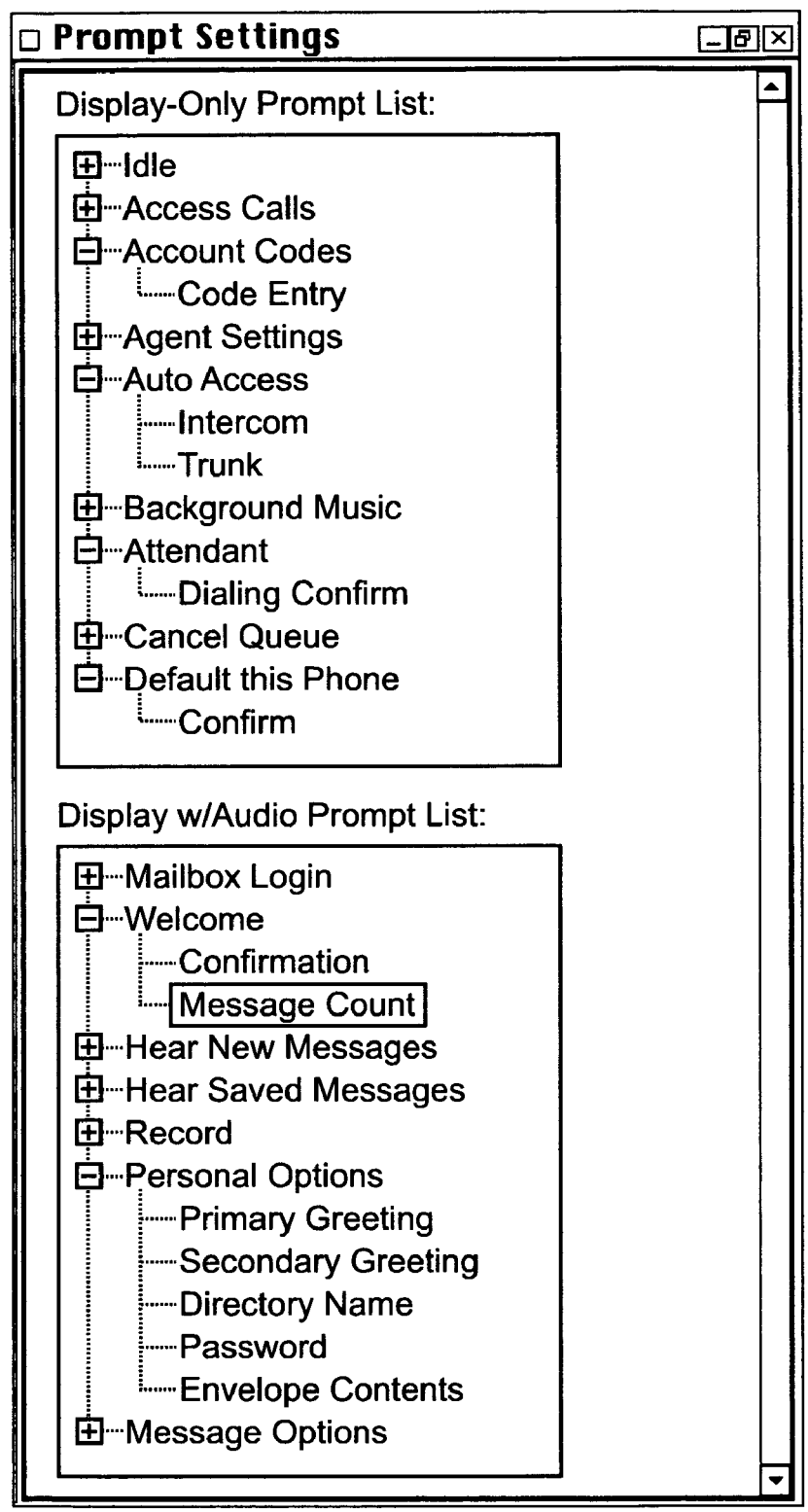

FIG. 6 illustrates another embodiment of a prompt list 602 for use in a prompt translation application of the invention. Similar to prompt list 502, prompt list 602 includes a list of prompts available for the current translation. However, list 602 is arranged in a tree structure and may be separated by "display-only" and "display with audio" type prompts. Depending on the environment, list 602 may provide the administrator a quick method to identify a prompt by its place in the system.

Referring again to FIG. 5, the prompt translation application may further include a context description field used to display a brief description of the prompt selected in the prompt list, e.g., list 502. Screen 500 shows a context description field below prompt list 502 that states, "This prompt is displayed when the user has new voice mail messages" that refers to the prompt "Message Count." Since the description is brief, one embodiment includes a more detailed explanation about the highlighted prompt by selection of some other means such as by pressing the F1 key.

Exemplary screen 500 further includes a Sort dropdown box. This may be used to specify a sort order for the prompts in prompt list 502. For example, the administrator may sort the prompts alphabetically by prompt name, by groups of translated and non-translated prompts, or any other suitable technique.

Display field 505 is used to simulate the way the text portion of the highlighted prompt in prompt list 502 will appear on an associated endpoint. For example, for the "Message Count" prompt, the endpoint may display the number of new messages stored for that endpoint. In one particular embodiment, the display field uses different colors to represent non-variable and variable portions of the prompt. For instance, a blue font color may indicate non-variable segments, i.e., "NEW MESSAGES", and red font color indicate variables. In this particular example, a red underscore may be used to indicate the location of the variable in the text portion of the prompt. If the currently selected prompt does not have a text portion, this control feature may be disabled so the field would be blank.

Tab control 506, 507 is used to translate the text and/or audio portions of the selected or highlighted prompt. As illustrated, there are two tabs, namely Text and Audio. Preferably, the tabs will appear only if the prompt has a portion corresponding to that tab. The Text tab 506 includes the controls needed to translate the text portion of the prompt selected from prompt list 502 and the Audio tab 507 (FIG. 9) similarly includes the controls needed to translate the audio portion of the prompt. A variable list for the particular prompt is displayed and may be shown in different font, color or style to indicate mandatory variables. For example, some prompts may include both mandatory variables (i.e., the number of new messages) and optional variables (i.e., the time of day each message was received). In this manner, the administrator can quickly discern which variables are required in the prompt and which may be left out. In one embodiment, items in the variable list may be double-clicked to be inserted at a cursor position in the Text or Audio Prompt field. In another embodiment, the Add button is used to insert a variable selected from the Variable list. The Text Prompt field of tab 506 is used to author a translation for the text portion of the prompt selected. Non-variable portions of the prompt (e.g., "new messages") may be simply typed in, and variables are added to the Text Prompt field by double-clicking them in the variables list or by clicking the Add button. As shown in screen 500, variables added to the Text Prompt field are displayed by enclosing their names in square brackets. Other means for displaying the variables may be by bold font, color or different style. Preferably, as the text portion is being edited in the Text Prompt field, Display field 505 is updated simultaneously to show how the text portion will appear on the endpoint.

Audio tab 507 is similar in nature to Text tab 506, except this tab includes controls for the audio portion of the prompt selected from prompt list 502. In this particular embodiment, the audio prompt is comprised of individual segments. The Available Audio Segments list includes all the non-variable audio segments present in the current translation, and the base translation of the current translation. The segments may be numbered, as shown, as well as described in a line of text next to the number. Audio segments may be added to the list as needed. The Audio Prompt field is used to assemble variable and non-variable portions of the prompt. For example, the present illustration has an audio prompt order of "4-[input]-5-3" which equates to "You Have (variable) New Messages." Variable portions of a prompt are preferably distinguished from non-variables by enclosing the name in square brackets and/or bolding them. The order of the segments of the audio prompt can be rearranged by using the Up and Down buttons, can be removed by selecting the segment and the Remove button, and can be added by selecting the segment from the Available list and the Add button or double-clicking the segment. The Play button is used to play the audio portion of the prompt for review and the Stop button is used to stop a prompt currently being played. A ding sound may be heard to represent the variable portions of the prompt.

Figure 7:
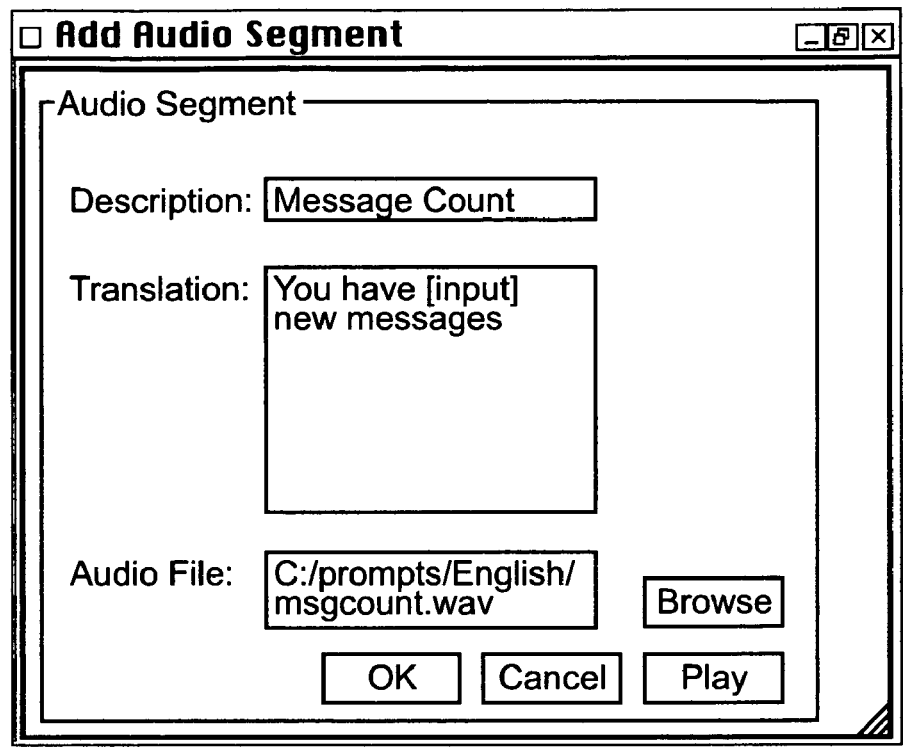

In one embodiment, when a new audio segment is added to the Audio Prompt, a dialog box such as screen 700 of FIG. 7 is created. The Description field is a text field used to add comments about or title the audio file. The Translation field is used to type in what the audio says in words. In this illustration, the audio says, "you have [input] new messages." The Audio File field can be used to load a wav file or equivalent. The path of the audio file can be manually typed in or selected from a file found using a Browse button. In another embodiment, a text file may be converted to sound using a text-to-speech conversion program. The Play button allows the administrator to hear an audio file before adding the audio to the prompt list.

Referring again to screen 500, status bar 510 displays information about the current translation. For example, bar 510 may include the language of the current translation, the base translation of the current translation, the number of prompts translated so far, the number of prompts inherited from the base language, and the number of prompts remaining to be translated.

Figure 8:
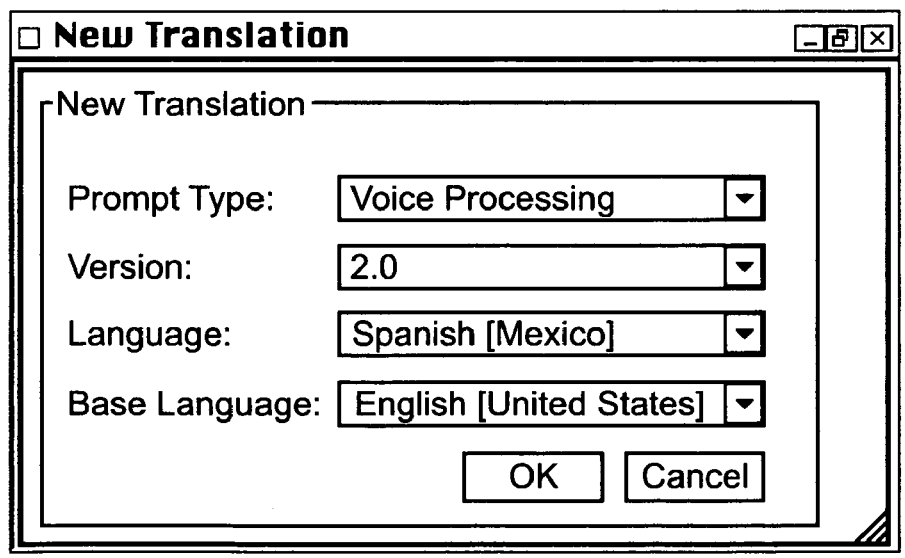

The menu items of screen 500 include File, Edit, and Help. It should be appreciated that including menu items on a screen are well known techniques for including various control tabs and operations, thus only a few of the individual items within each menu item will be discussed in detail. The File menu item may include items such as New, Open, Upgrade, Save, Save As, and Exit. The New menu item is used to create a prompt translation for a specified language. Selecting the New menu item may instantiate a dialog box such as screen 800 of FIG. 8. A dropdown box labeled Prompt Type may include options for Voice Processing (audio messaging prompt) and Call Processing (visual messaging prompt). The Version dropdown box includes all the translatable versions for the option selected in the Prompt Type box. For example, if Voice Processing is selected, then all the voice processing prompt versions are displayed in the Version dropdown box. The Language box includes a list of languages supported by the Prompt Translation Application. The Base Language dropdown box includes the list of translations available for the Prompt Translation Application to be used as a base for the current translation being created.

The Open item in the File menu may be used to open an archive file. The Upgrade menu item can be used to upgrade an archive file (visual or audio) to a specified version. One particular embodiment of the present invention may provide the administrator with the number of new prompts added by the upgrade that may need translation. In another embodiment, any un-translated prompts added by the upgrade may simply revert to the base language. The Save and Save As menu items are used to save the current translation (audio or visual) to a file.

Within the Edit menu item, a Revert to Base menu item may be available. This item resets the contents of the prompt currently being translated to the contents of the equivalent base translation prompt. This feature may be particularly useful if the administrator wishes to return a prompt to the base language without having to translate each prompt one-by-one. The Edit menu may also include a Character Map menu item to select a character used by the language of the current translation not available on a keyboard.

Another aspect of a prompt language translation application of the present invention is the ability to customize prompts for specific endpoints. As previously mentioned, various types of endpoints are contemplated and available for use with the present invention. Device-specific parameters may be added to the information in the Visual and Audio Prompt Archives so devices such as PDAs, cell phones, or call center status screens can receive translated prompts that been uploaded to the messaging system(s). Once the system identifies what type of device is attached and is receiving service, this feature allows the system to adjust the prompts in real time to match the device. For example, a cell phone may allow five lines of information to display when a parameter of <DispLine=5> is added. This particular parameter instructs the prompt application to decrease the number of menu items. In some cases it may be possible to use a mark up language, for example, XML, to transfer information between the archives and the device. In this case, compression may be needed or desired. When the device is detected as attached to the system, the tagged display information may be extracted and sent to the device as needed.

Presented herein are various systems, methods and techniques for prompt language translation application, including the best mode. Having read this disclosure, one skilled in the industry may contemplate other similar techniques, modifications of structure, arrangements, proportions, elements, materials, and components for prompt translation in a telecommunications system that fall within the scope of the present invention. These and other changes or modifications are intended to be included within the scope of the present invention, as expressed in the following claims.

The invention claimed is:

1. A telecommunications messaging system comprising:
a switching apparatus for connecting real-time voice and multimedia communications to a plurality of endpoints;
a visual messaging system coupled to the switching apparatus and to the endpoints and configured to display a plurality of textual messaging prompts at the endpoint when a message event occurs, the textual messaging prompts retrieved from a visual prompt memory of the visual messaging system;
an audio messaging system coupled to the switching apparatus and to the endpoints and configured to cause the endpoint to play a plurality of sound recordings representing a plurality of audio messaging prompts when the message event occurs, the audio messaging prompts retrieved from an audio prompt memory of the audio messaging system;

an administration workstation in communication with the visual and audio messaging systems, the workstation having a display, an audio system and an input device;

a messaging prompt translation computer program product retrievable by the administration workstation and having programming code for causing the workstation to display a plurality of messaging prompts in a base language stored in a base language file at an archive of the telecommunications system and to play a recording of the messaging prompts in the base language, and for revising the plurality of messaging prompts in a secondary language in response to directions designated by the input device, and for storing the revised messaging prompts in a secondary language file at the archive; and an administration programming computer product retrievable by the administration workstation and having programming code for uploading the files in the archive to the audio prompt memory and the visual prompt memory, and for associating one of the files with each of the endpoints, whereby, each of the endpoints display and play the messaging prompts in either the base language or the secondary language.

2. The messaging system of claim 1, wherein the endpoints comprise desktop telephones, IP-based phones, software-based phones, keysets, personal computers, computing devices, personal digital assistants, pagers, wireless remote clients, and messaging devices.

3. The messaging system of claim 1, wherein the base language file is downloaded to the archive from a bulk-generated translation.

4. The messaging system of claim 1, wherein the secondary language comprises one of a foreign language or a dialect of the base language.

5. The messaging system of claim 1, wherein the workstation displays the textual messaging prompts and the audio messaging prompts.

6. The messaging system of claim 1, wherein the workstation displays the messaging prompts one by one in response to directions designated by the input device.

7. The messaging system of claim 1, wherein the secondary language comprises correcting the syntax of the base language.

8. The messaging system of claim 1, wherein the workstation displays the messaging prompts in the base language by showing a simulation of a textual component of the messaging prompt as it will appear on the endpoint, and by showing a formula for the textual component, the formula includes a variable character and a non-variable character.

9. The messaging system of claim 8, wherein the workstation further displays the messaging prompts by showing a list of audio segments composing an audio component of the messaging prompt, each segment comprises one of a short audio message or a variable character.

10. The messaging system of claim 9, wherein the list of audio segments comprises a numerical listing and each number represents a segment.

11. The messaging system of claim 9, wherein the revising of messaging prompts includes an amendment to the list of audio segments, the amendment comprises adding, removing, and moving individual segments.

12. A method of message prompt translation in a PBX telecommunications system, said system including a plurality of endpoints communicating with said PBX and a messaging system for transmission of messages, said messaging system having a plurality of message prompts, and an administration workstation having a display, a user input device, an audio system and a CPU, said method including the steps of:

a. displaying a visual component and an audio component of one of said message prompts in a base language on said workstation display;

b. receiving, by said user input device, a textual edit to said visual component of said one message prompt, said edit in a second language;

c. receiving, by said user input device, a selected order of audio sounds composing said audio component of said one message prompt, said order in said second language;

d. playing an audible composition of said audio component in said second language;

e. saving said edit to said visual component and said order of said audio component, both in said language, in a retrievable file of said system;

f. repeating said steps for said plurality of message prompts; and wherein, a user of one of said endpoints selects said file in said second language for use on said endpoint, and said endpoint displays and plays said plurality of message prompts in said second language.

13. The method of claim 12, wherein the secondary language comprises one of a foreign language or a dialect of the base language.

14. The method of claim 12, wherein said receiving a selected order of audio sounds comprises a selection by said user input device of a wav file.

15. The method of claim 12, wherein said playing comprises a multi-media sound system of said workstation.

16. A prompt translation method for use in a telecommunications messaging system having a plurality of endpoints participating in a plurality of voice mail messages which are viewable and audible as message prompts at each of said endpoints, said method comprising:

storing data comprising a plurality of message prompts in a base language at a visual/audio prompt archive of said system;

viewing at a workstation display each of said message prompts in said base language and determining if a translation of a visual component and an audio component of said message prompt is needed;

translating by user input said visual and audio components of said message prompt to obtain a translated visual component in a translated language and a translated audio component in said translated language;

viewing at said display said translated visual component in said translated language;

hearing at said workstation said translated audio component in said translated language; and storing data comprising said message prompt in said translated language in a messaging memory of said system, whereby, upon selection for each endpoint, said voice mail messages are viewable and audible at said endpoints in said translated language or said base language.

17. The prompt translation method of claim 16, wherein said translating comprises typing in said translated language a correct syntax for said visual component and selecting an order of audio segments to be played in said translated language for said audio component.

18. The prompt translation method of claim 16, wherein said viewing said translated visual component comprises a simulation of said visual component as it will appear on the endpoint, and a formula for said visual component including a variable character and a non-variable character.

19. The prompt translation method of claim 16, further comprising viewing an accounting comprising a total number of message prompts and a number of translated prompts.

20. The prompt translation method of claim 16, further comprising selecting a prompt to translate from said plurality of message prompts.

21. The prompt translation method of claim 16, wherein said translated language comprises a dialect of said base language.

22. A computer system for providing translation of a plurality of message prompts for use in a PBX-type messaging system on a plurality of associated endpoints, the system comprising:

an administration site means comprising
- (1) first means for displaying a visual component of each of said message prompts to an administrator,
- (2) second means for playing an audio component of each of said message prompts to the administrator,
- (3) third means for permitting the administrator to create a translated version of said visual and audio components of said message prompts,
- (4) fourth means for storing said translated version of said visual and audio components in a prompt memory of said messaging system, and
- (5) fifth means for associating said translated version of said message prompts to at least one of said associated endpoints; and an endpoint site means comprising
- (6) sixth means for displaying said translated version of said visual component of said message prompt to an end-user when a PBX-type message is available for said associated endpoint, and
- (7) seventh means for playing said translated version of said audio component of said message prompt to the end-user when said PBX-type message is available for said associated endpoint.

23. The computer system of claim 22, wherein said second means comprises a multi-media sound system of a workstation.

24. The computer system of claim 22, wherein said third means comprises accepting keystroke inputs.

25. The computer system of claim 22, wherein said third means comprises browsing a database for a wav file for said audio component.

26. The computer system of claim 22, wherein said second means comprises a text-to-speech conversion to play the audio component.

27. The computer system of claim 22, wherein said third means comprises adding device-specific parameters to create said translated version.

28. The computer system of claim 22, wherein said third means comprises a text-to-speech conversion for said audio component.

* * * * *